June 12, 1951 G. BUCKY 2,556,866
EXPOSURE INDICATOR AND FIELD DETERMINATOR
FOR X-RAY APPARATUS
Filed Nov. 16, 1949 4 Sheets-Sheet 2
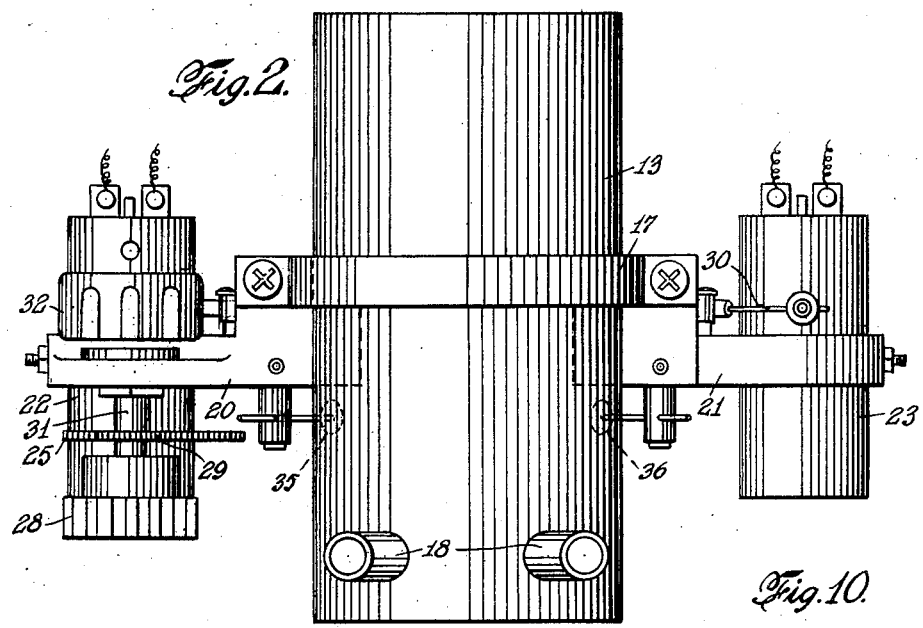
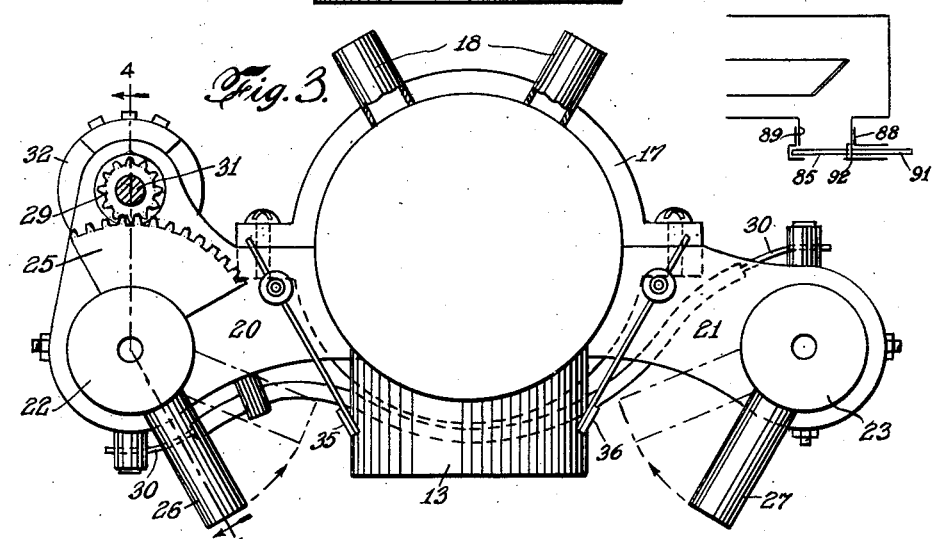
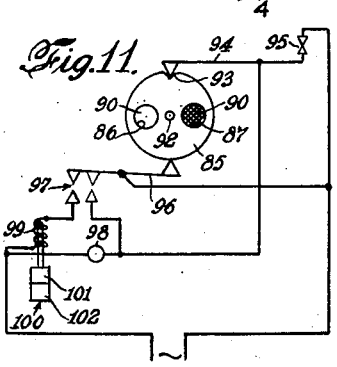
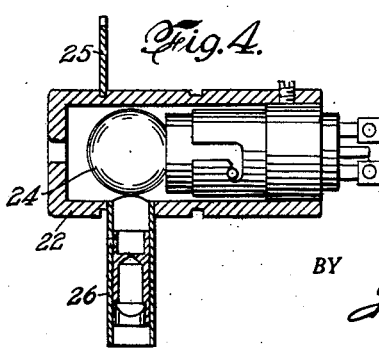
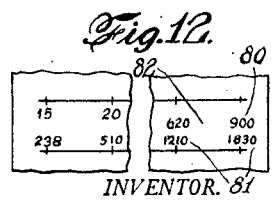
INVENTOR.
GUSTAV BUCKY
BY
ATTORNEY.

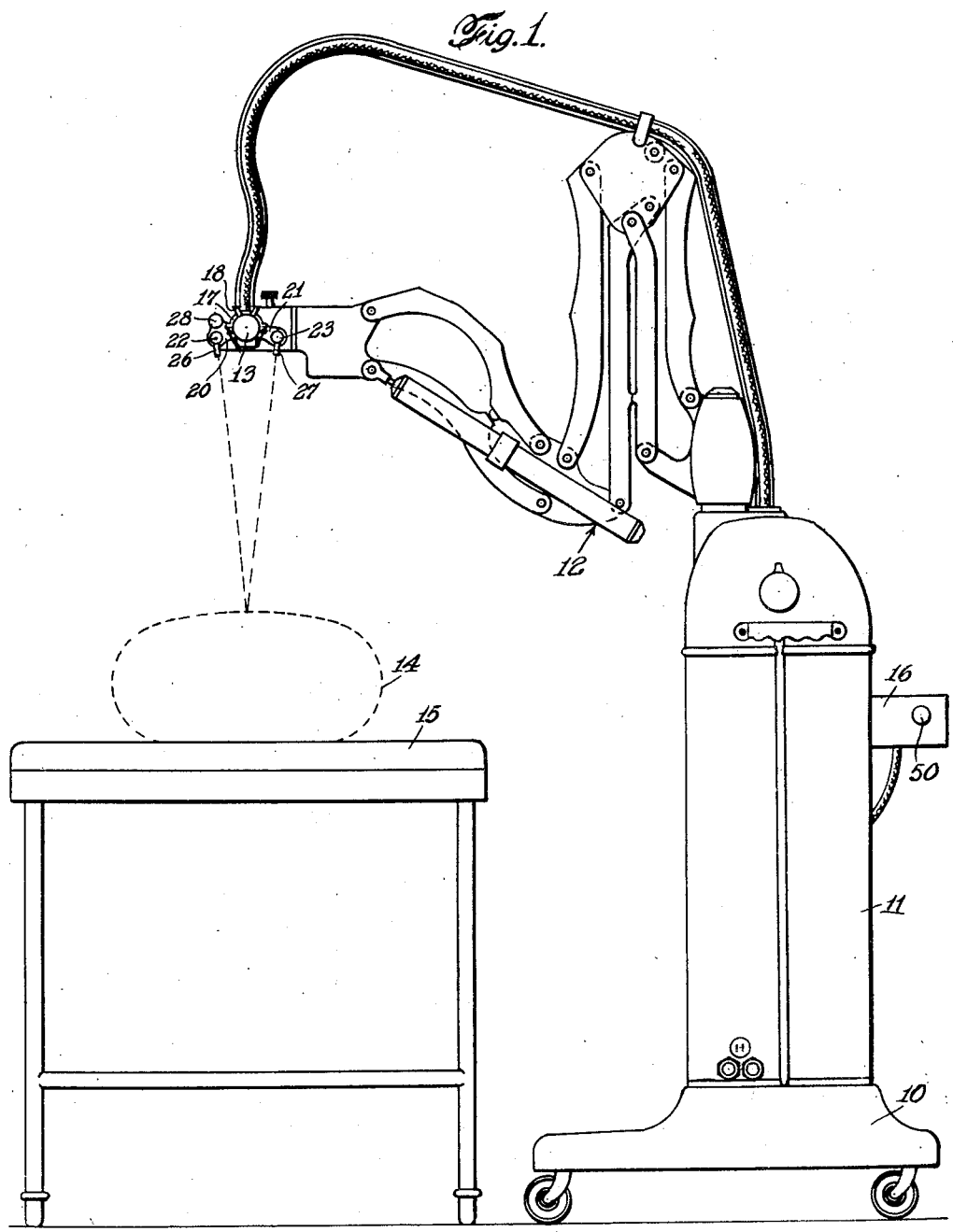

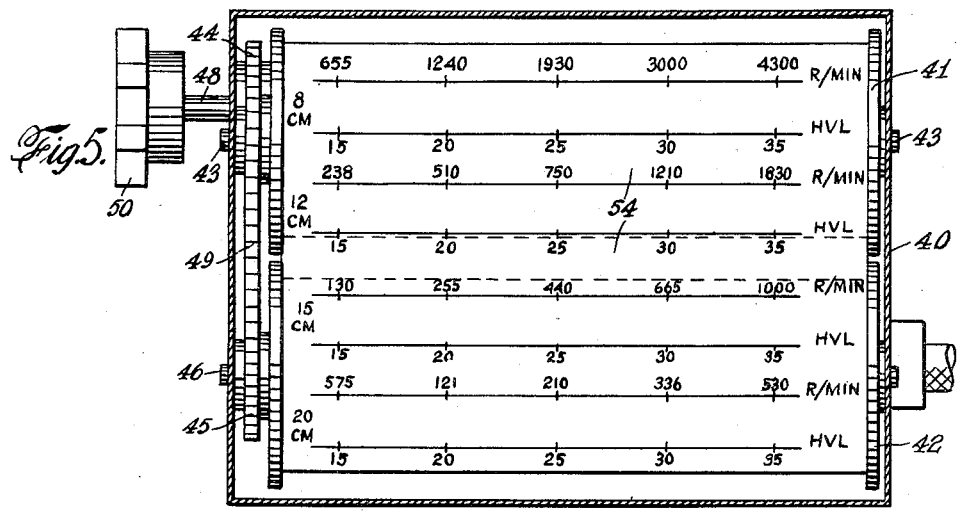
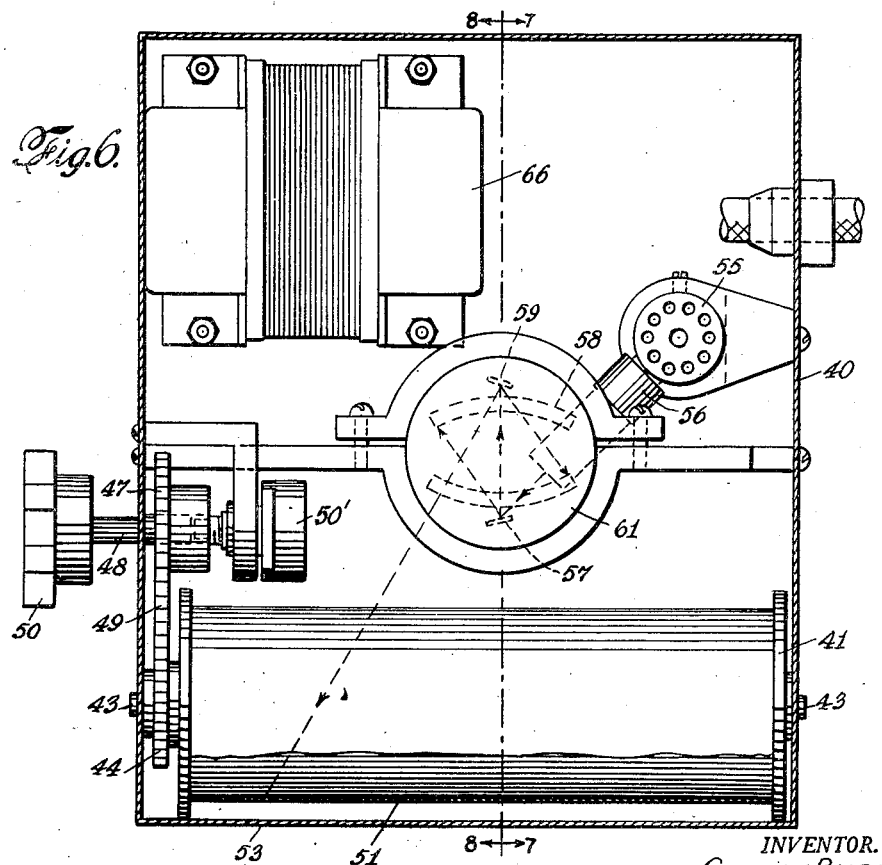

June 12, 1951
G. BUCKY
2,556,866
EXPOSURE INDICATOR AND FIELD DETERMINATOR FOR X-RAY APPARATUS
Filed Nov. 16, 1949
4 Sheets-Sheet 4
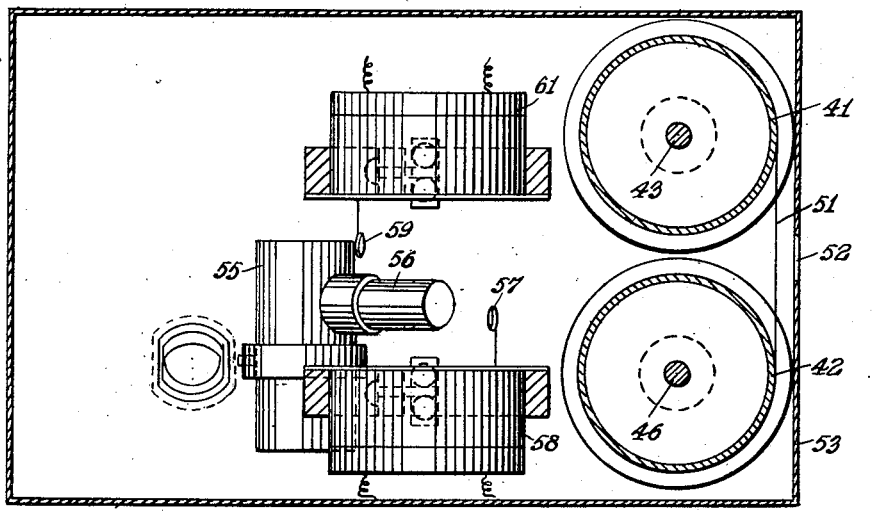
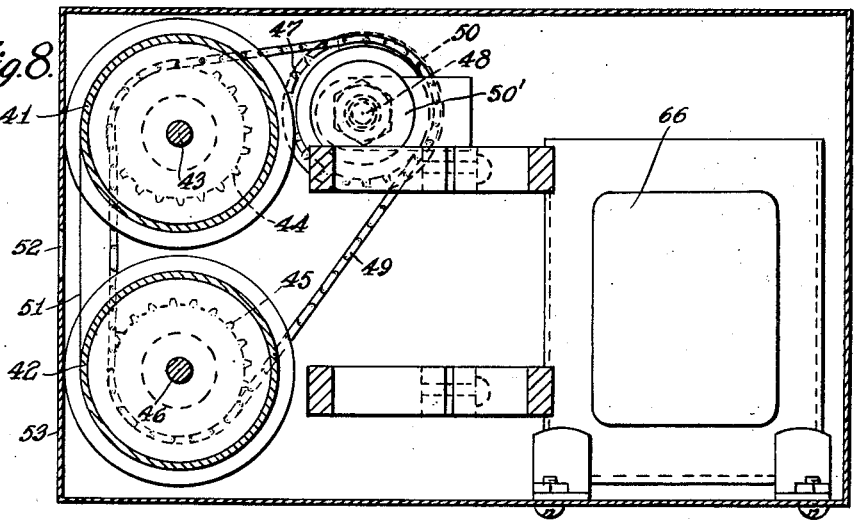
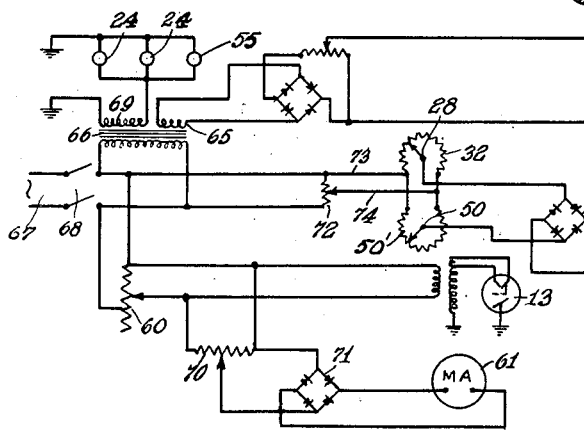
INVENTOR.
GUSTAV BUCKY
BY
Fred P. Schuetz
ATTORNEY.

Patented June 12, 1951

2,556,866

UNITED STATES PATENT OFFICE 2,556,866

EXPOSURE INDICATOR AND FIELD DETERMINATOR FOR X-RAY APPARATUS

Gustav Bucky, New York, N. Y.

Application November 16, 1949, Serial No. 127,735

15 Claims. (Cl. 250—93)

The invention relates to X-ray, Grenz-ray and like apparatus; and more especially to indicating means, applicable readily to such apparatus, whereby it becomes possible accurately to establish the desired conditions or intensity with respect to the radiations, for example, as in the manner indicated in my U. S. Letters Patent No. 2,212,854.

The present invention has for an object to provide a novel form of control and indicator apparatus of this nature which may be readily associated with standard X-ray and like equipment so that not only may a measure of the distance from the source of the X-rays to the area or field irradiated be directly ascertainable as in being displayed on a suitable indicator element or scale, but as well the radiation intensity and quality of the rays directed to said area for the particular setting.

Another object of the invention is to associate with the indicator apparatus, more particularly a manually operable portion thereof, means whereby the effective field of radiation may be simultaneously indicated.

Still another object of the invention is to provide a combination of electrically interlocked members whereby no reading will be afforded until there is effected an illumination of indications on a selected properly calibrated scale member by manual adjustment of the said scale member to correspond to the particular distance setting to which the X-ray tube has been manually adjusted for use.

A still further object of the invention is to provide means whereby the scale readings are automatically accommodated to ray filters when utilized with the X-ray tube.

This invention has for an object, also, to provide a mechanically rugged apparatus which shall be simple to operate.

In its simplest embodiment, the novel combination comprises two preferably electrically interconnected units, or these may be combined in a unitary structure, one at least, i. e., a distance-determining member, being movable with the head or electrode housing of the X-ray projecting apparatus to partake of its adjustments. The other may then be located at some convenient point of the frame or apparatus with intermediate flexible cable provided to admit of the adjustment of the radiation head in varying the distance from the source of the radiations to the area to be irradiated.

Provision is made to indicate the range of this adjustment on a suitable scale, for example, by providing a manually adjustable range finder of the light-beam type on the movable head and transmitting its adjustments electrically and optically to another and manually adjustable indicator element, the indications of which do not become effective, however, until both manually adjustable means have been located in appropriate angular positions. To this end a circuit is arranged to be closed to a lamp associated with the indicator, as well as circuits to two range-finder lamps; and the light of the indicator lamp is reflected and directed to an indicator element scale such as a translucent band or screen located before a window, said reflection being effected by a mirror carried by the index or pointer arbor of an ammeter connected across the arms of a Wheatstone bridge. This mirror serves to direct and to swing indirectly a beam of light from the lamp across the indicator element which is movable transversely to the plane of swing of the said beam of light. The beam reflected from the said mirror, however, is directed first to a second mirror of a voltmeter which is located in the X-ray circuit, the said second mirror swinging in accordance with the desired X-ray voltage to be applied.

No indication on the scale will be effected until a rheostat for balancing the bridge is properly set in conformity with the particular range at which the rays are to be applied, said rheostat controlling the scale movement and having thereby brought the corresponding scale portion into view.

The angular movement of the second mirror will swing the light beam along the adjusted scale to suit the corresponding applied voltage or radiation intensity, it being understood that the respective positions of the two mirrors are so selected that when the range adjustment on the scale has once been completed and the ammeter rheostat adjusted to compensate the same, the varying angular adjustments of the second mirror will not cause the beam of light rays to leave its surface. However, a minute variation in the angular adjustment of the first mirror serves to cause such effect.

A third mirror, or rather pair of mirrors, also may be associated with the range-finder lamps to delineate the working field of the X-rays when the same have been focussed upon a patient by the range finders.

When ray filters are to be utilized in connection with the X-rays from the X-ray tube, provision is made to accommodate the scale indications to the reduced effect of the rays, and to restore automatically the normal indication when the filter is removed.

The nature of the invention, however, will best be understood when described in connection with the accompanying drawings, in which:

Fig. 1 is an elevational view of an ambulant type of X-ray apparatus and illustrates the application thereto of the novel indicator and field determinator.

Fig. 2 is a plan view of the range finder portion of the indicator and field determinator with X-ray tube mounted therein; and Fig. 3 is a front elevation thereof, both views being on an enlarged scale.

Fig. 4 is a transverse section through one of the range finder elements, taken on the line 4—4, Fig. 3, and looking in the direction of the arrows.

Fig. 5 is a front elevation of the scale or indicating portion of the indicator means.

Fig. 6 is a plan view of said scale or indicating mechanism with the top of housing thereof removed.

Figs. 7 and 8 are vertical sections taken respectively on the lines 7—7 and 8—8, Fig. 6 of the drawings, and looking in the direction of the arrows, with meters omitted in the latter figure.

Fig. 9 is a schematic showing of the novel indicator with wiring diagram illustrating the electrical connections involved in the operation of the same.

Fig. 10 is a fragmentary longitudinal section of the X-ray tube (on a reduced scale) as modified to provide filter means for the rays emitted thereby; and Fig. 11 is a schematic diagram illustrating illumination screen means automatically controlled by the positioning of the X-ray filter means.

Fig. 12 is a fragmentary plan view of a scale portion calibrated for filter use with the X-ray tube.

Referring to the drawings, more particularly Fig. 1 thereof, 10 designates generally the base of an ambulant type of X-ray apparatus from which extends the vertical standard or housing 11 carrying the adjustable assembly 12 from which is supported the conventional X-ray tube with housing 13 of any standard and well-known construction. Rays from this tube are designed to be directed to a predetermined area such as a portion to be irradiated on the body of a patient, indicated at 14 and resting upon a table 15.

The novel indicator and field determinator are designed to be carried by the apparatus, being preferably separated into two portions, the scale element for reading the intensity and quality of the X-rays applied to the patient 14 being, for example, mounted in a housing 16 carried by the standard 11 to be conveniently accessible to the operator of the X-ray apparatus and the readings readily visible, while the range-finder portion, suitably mounted in a framing 17, is attached to the X-ray tube 13 through said framing.

The latter or light-beam range-finder portion is shown more particularly in Figs. 1 to 4, inclusive, and includes the more or less annular framing 17 which may carry also tubular extensions 18 for hose connections (not shown) designed to maintain the tube 13 at a suitable temperature, as is well understood. Extending from opposite sides of the annulus are arms 20 and 21 respectively terminating in an annular portion designed to mount for rotation therein respective tubular elements 22 and 23 and housing each a source of illumination such as the lamps 24.

There extends radially from one of the tubular elements a gear segment 25, and from each tubular element, also, radially, a beam-directing tube 26, 27 respectively, each being provided with a suitable optical system for producing the respective beams. These beams are designed to be focussed upon the area to be irradiated until the beams coincide in a point thereon, as is indicated by the broken lines, Fig. 1 of the drawings. This is effected, for example, through manual operation of a knob 28 of a pinion 29 engaging the teeth of gear segment 25 of the said tubular element 26. Like angular movement is imparted to the other tubular element, but in a direction to converge simultaneously the tubes or to spread the same simultaneously. This may be effected conveniently by a cable transmission 30, connections of the latter to the respective tubular members being made adjustable for setting the members initially at the proper angles.

The shaft 31 of knob 28 operates a potentiometer or rheostat 32 which is included in an electrical circuit or one leg of a Wheatstone bridge, as is hereinafter more fully set forth. By this expedient, manual adjustment of the light beam to conform to the different locations vertically of the X-ray tube 13 relatively to the area to be irradiated will effect a variation in the bridge circuit, and provision is made for adjustment manually to balance the bridge, this latter adjustment serving to provide a suitable indication on a scale calibrated to be indicative of the radiation intensity applied at the adjusted range, as will hereinafter be more fully set forth.

There is provided, also, means in connection with the range-finder portion of the hereinbefore described novel indicator means which will, simultaneously with the said beam adjustments, afford field determinations of the area over which the projected X-rays are effective.

Such means, as shown, comprise a pair of fixed reflectors 35 and 36 which are carried by the annular framing 17 upon opposite sides of tube 13; and the same are so located with respect to the corresponding beam-directing tubes 26 and 27 that when the latter are adjusted, in the direction of the arrows to the respective positions indicated in broken lines, they will reflect the beams of light from said tubes 26, 27 to project the same upon the area to be irradiated and delineate the effective working area or field for the X-rays projected from the tube 13. It will be understood that said tube 13 is first set to the desired working distance and that the mirrors 35, 36 are fixed in conformity with a predetermined coverage calibration as determined by test, the area delineations then being correct for all the working distances between patient and the X-ray source or tube 13.

To secure a reading of the intensity of the X-rays at the various distances, provision may be made to set manually a calibrated scale while at the same time balancing a Wheatstone bridge circuit, Fig. 9, which has become unbalanced in converging the beams directed from the two beam-directing tubes 26, 27 upon the area to be irradiated. Thus, reference being had to Figs. 5 to 9 of the drawings, the indicating mechanism is shown as contained preferably in a housing 40 in which are mounted two rotatable drums 41 and 42, the shaft 43 of the former having fixed thereon a sprocket 44 and a similar sprocket 45 is fixed to the shaft 46 of drum 42. A further sprocket 47 is fixed on a shaft 48 parallel to the shafts 43 and 46 and a sprocket chain 49 rides over all three sprockets, the drive for said chain being effected from the sprocket 47.

To this end, the shaft 48 of said sprocket has fixed thereto a knob 50 which is located exteriorly of the housing to be readily accessible for manual operation in shifting a web or screen 51 of translucent material. The web is fixed to and extends over a portion of the periphery of the two drums 41 and 42 and as the knob is turned in one direction or the other, said web is shifted before an aperture or window 52 in the wall 53 of the housing, said aperture being in the nature of a narrow slot extending transversely to the movement of the web, successive sets of calibrations 54 being brought into view in accordance with the adjustment of the rheostat 50' required to rebalance the Wheatstone bridge after the balance has been upset as a result of the adjustment of rheostat 32 when manipulating knob 28.

In accordance with the invention, however, no visible indication of the screen reading is afforded until the aforesaid balance is secured, at which time a beam of light is directed from behind the screen to illuminate its indicia presented before the aperture. To this end a source of illumination such as the electric lamp represented by its housing 55 and a beam-directing optical sytem 56, is provided within the housing 40 and is designed to direct a beam of light to a mirror 57 which moves with the arbor of a milliammeter 58 of the Wheatstone bridge, Fig. 9. So long as the bridge circuit remains balanced, mirror 57 will pick up the beam of light and will direct it to the screen 51 at the aperture for illumination of the scale and preferably indirectly through the interposition of a second mirror 59, as is indicated by the broken lines. Instead of illuminating the scale, the directed beam of light may be caused to activate other means affording responses.

It is preferred, also, to so adjust the mirror relationships that mirror 57 will assume the proper position for indications just short of nonenergization of its controlling milliammeter, thereby rendering the indication portion of the apparatus inoperative should, for any reason, the circuit to such meter become wholly interrupted. The second mirror 59 is interposed to provide for an indication by control also with respect to the quality of the X-rays applied to the patient. That is to say, as the kilovolts are altered, as by means of a potentiometer 60, Fig. 9, a meter 61 in the power circuit angularly affects the mirror 59, which may to this end be connected to the meter arbor; and the said mirror then shifts the beam from mirror 57 across the screen so that an altered indication thereon is visible.

It will be understood that for each unit of change in distance between the source of the X-rays and patient, a correspondingly calibrated scale of radiation intensity is provided successively along the screen, such scale being graduated transversely thereof in conformity with the said radiation intensity or milliamperes applied.

To insure an initial or false zero reading of the meter 58, a rectified potential from the secondary 65 of a transformer 66, deriving its power from the main 67 upon closing of switch 68, is applied across the meter 58. A further secondary 69 supplies power to the respective lamps of the beam-directing optical system 56 and the beam-directing tubes 26, 27. To energize the meter 61, a potentiometer 70 is connected across the leads energizing the X-ray tube 13 and the potential applied to said meter first rectified by the full-wave rectifier 71.

A potentiometer 72 supplies the potential to the Wheatstone bridge through leads 73, 74, meter 58 being connected across said bridge with the potential rectified through the full-wave rectifier 75.

In some circumstances it is desirable to introduce ray filters, particularly in radiation therapy, for the rays emitted by an X-ray tube. Such introduction would result in diminishing the intensity of the radiation applied and the corresponding normal intensity indication on the screen for the particular voltage and distance would then not be correct. Generally, such filter means are used only under the higher applied voltages so that only the corresponding portions of the calibrations would be modified as is hereinafter set forth and as is shown in Fig. 12 of the drawings. As indicated in this figure, juxtaposed double indicia 80 and 81 for each of the higher voltage applications are provided along the calibration areas 82, the one indication 80 being of a predetermined color (green) and the other indication 81 of a color complementary thereto (red). When illuminated by the white light reflected by mirrors 57 and 59, both indications are visible; but, if a green filter be then interposed in the path of the white light, only the indication in red will be fully visible, and the reverse is true when a red filter is interposed.

The introduction of these complementary color filters is to be effected automatically with the introduction of a ray filter in the path of the X-rays. To this end, a ray filter may be provided in the nature of a disk 85, having two apertures 86 and 87 and rotatable in a sleeve 88 slidable over the tubular outlet 89 for the rays. The former aperture 86 allows the radiation to emanate unhindered while the aperture 87, which is of equal size, is covered with the desired filter material 90.

The disk 85 is manually rotatable, through its portion 91 which projects through the sleeve 88, about the spindle 92 over an angle of at least 180° and bears a notch 93 in its circumference to position alternatively one or the other of the apertures accurately with respect to the rays directed from the outlet 89. The notch 93 is designed to receive the one end of a contact-controlling lever 94 serving to close, when engaged in the notch 93, a circuit at the contacts 95. A similar contact-controlling lever 96 is provided at a point diametrically opposite the contact-controlling end of the lever 94 to operate to close or open a circuit at the pair of contacts 97. When either of the contacts is closed, lamp 98, which would then correspond to the lamp 55, Fig. 9, is energized; and, in the case of one of the sets of said contacts, i. e., contacts 97, would energize a solenoid 99 to shift a spring-loaded light filter frame 100 bearing two filter frames 101 and 102, for example, respectively of red and green color. It is understood that this screen is to be interposed in preferably a portion of the path of the beam of light reflected by the mirrors 57, 59 over the higher voltage sections 103 of the screen calibrations corresponding to the higher tube-applied voltages.

The arrangement is such that when the filter 90 is associated with the X-ray tube radiations, the solenoid remains deenergized and the red filter 101 is positioned under the spring loading in the mirror-directed beam, thereby causing the green indications 80 to appear black and become visible; while when aperture 86 is used in connection with the X-ray tube, energization of the said solenoid as aforesaid will set the green filter 102 in the path of the directed beam and cause the red indication 81 to be displayed as black and the former indication 80 to disappear substantially.

I claim:

1. The combination with a source of a beam of X-rays adjustable relatively to a field to be irradiated thereby; of means indicating the exact correspondence and equivalency of the effective irradiated area of the beam, comprising a pair of angularly movable light-beam directing members adapted to converge their respective beams upon the area; of a single manually operable means to adjust said members simultaneously, and an electrical circuit and means movable with said manually operable means for varying the potential of said circuit; and electrical measuring means responsive to variations in said electrical circuit.

2. The combination claimed in claim 1, wherein additional manually operable and electrical means are provided to vary the potential of the said circuit, and a calibrated scale element is provided and is set simultaneously with the manual adjustment of the said additional manually operable and electrical means.

3. The combination claimed in claim 2, wherein a mirror is provided and is adjustable angularly by the said electrical measuring means, and a source of light is provided to afford a beam reflectable through the positioning of said mirror upon the calibrated scale element.

4. The combination claimed in claim 3, wherein the mirror and its light source are associated such that the former fails to reflect light directed thereto from the latter when in an angular position resulting from potential applied to the measuring means just short of deenergization thereof.

5. The combination claimed in claim 3, wherein a further mirror adapted to receive a reflected beam from the first mirror is provided, together with means to adjust said further mirror angularly.

6. The combination claimed in claim 3, wherein a further mirror adapted to receive a reflected beam from the first mirror is provided, and electrical means are provided for controlling the quality of the X-rays as emitted by the source, said means affecting also the angular position of the said further mirror.

7. The combination claimed in claim 1, wherein an adjustable scale member calibrated in conformity with the adjustment of the X-ray beam source relatively to the irradiated field is provided, the electrical circuit comprises a Wheatstone bridge with the electrical measuring means connected across the bridge, and the means movable with the manually operable means for varying the potential is located in one branch of said bridge.

8. The combination claimed in claim 7, wherein an additional manually operable means and electrical means movable therewith are provided to vary the circuit potential, the latter being located in an opposing branch of said bridge, and a calibrated scale element is provided and is set simultaneously by the manual adjustment of the additional manually operable electrical means.

9. The combination claimed in claim 8, wherein potentiometers are provided as the two electrical means.

10. The combination claimed in claim 9, wherein the potentiometers are mechanically connected respectively with the light-beam directing members and to the calibrated scale element.

11. The combination claimed in claim 8, wherein the calibrated scale is a translucent web and the calibrations are provided successively thereon and transversely thereof.

12. The combination claimed is claim 1, wherein a fixed mirror is associated with each of the light-beam directing members, and the adjusting means for said members is movable to direct beams respectively to the associated mirrors for reflection by the latter of light beams therefrom to the field to be irradiated to delineate the active portion of the latter.

13. The combination with an X-ray irradiation intensity indicator comprising an X-ray tube and a manually adjustable translucent screen bearing over its surface pairs of calibrations respectively in complementary colors, said calibrations being indicative of the intensity of radiation in an object at various distances of the latter from the tube and in accordance with the voltages applied to said tube, and means adapted to direct a beam of light to the said calibrations; of filter means adapted to be associated with the X-ray tube in the path of the rays therefrom, together with a pair of circuit-controlling means actuated by the filter means; a pair of color screens respectively of colors complementary to the colored calibrations; and electrically actuated means in circuit with one of the said circuit-controlling means adapted to locate one or the other of said color screens in the path of the mirror-directed beam as controlled by the action of the X-ray tube filter means on said one of the circuit-controlling means.

14. The combination claimed in claim 13, wherein a manually rotatable perforated disk is provided, one of the perforations being covered with the filter for X-rays.

15. The combination claimed in claim 14, wherein the disk is provided with a notch adapted for engagement with the other of the circuit-controlling means when said filter is positioned to intercept the X-rays.

GUSTAV BUCKY.

REFERENCES CITED

The following references are of record in the file of this patent:

UNITED STATES PATENTS

| Number | Name | Date |
|---|---|---|
| 1,449,357 | Waite | Mar. 20, 1923 |
| 2,094,103 | Horsley et al. | Sept. 28, 1937 |
| 2,212,854 | Bucky | Aug. 27, 1940 |
| 2,376,836 | Tunnicliffe | May 22, 1945 |
| 2,390,065 | Gelb | Dec. 4, 1945 |
| 2,455,928 | Hawks | Dec. 14, 1948 |